INVENTOR.
JEAN C. RABIER
BY
Nicholas T Volk
ATTORNEY.

Nov. 1, 1960 J. C. RABIER 2,958,865

RADIO LANDING SYSTEM

Filed Aug. 8, 1957

6 Sheets-Sheet 2

INVENTOR.
JEAN C. RABIER
BY
Nicholas T Volk
ATTORNEY.

Nov. 1, 1960 J. C. RABIER 2,958,865

RADIO LANDING SYSTEM

Filed Aug. 8, 1957 6 Sheets-Sheet 3

INVENTOR.
JEAN C. RABIER
BY
Nicholas T Volk
ATTORNEY

Nov. 1, 1960 J. C. RABIER 2,958,865

RADIO LANDING SYSTEM

Filed Aug. 8, 1957

6 Sheets-Sheet 4

INVENTOR.
JEAN C. RABIER
BY
Nicholas T. Volk
ATTORNEY.

Nov. 1, 1960 J. C. RABIER 2,958,865

RADIO LANDING SYSTEM

Filed Aug. 8, 1957 6 Sheets-Sheet 5

INVENTOR.
JEAN C. RABIER
BY
Nicholas T. Volk
ATTORNEY.

INVENTOR.
JEAN C. RABIER
BY
Nicholas T Volk
ATTORNEY.

United States Patent Office 2,958,865
Patented Nov. 1, 1960

2,958,865

RADIO LANDING SYSTEM

Jean C. Rabier, Hawthorne, Calif., assignor, by mesne assignments, to The Marquardt Corporation, a corporation of California Filed Aug. 8, 1957, Ser. No. 677,144

21 Claims. (Cl. 343—108)

This invention relates to automatic landing systems suitable for guiding planes to runways, and more particularly, to that type of radio landing equipment which is suitable for guiding and landing the aircraft on the airfield runways, up to, and including the actual touching of the runway by the landing gear of the aircraft.

The main aircraft landing aids at the present time are the ground control approach systems, also known as GCA, and the instrument landing systems, or the ILS. The ILS, as a rule, are used in connection with a frequency modulation radio altimeter. The GCA system, now in use, locates an aircraft by means of special radar systems and transmits, over a separate radio link, the obtained information to the pilot. This enables the pilot to direct his aircraft to the runway to the point where he sees the ground. From then on, the pilot uses his own sight in landing the aircraft. The experimental computer-controlled GCA systems eliminate the radio link and ground the plane automatically.

The ILS generally provide special electromagnetic fields over the runway. These electromagnetic fields are used by a receiver, mounted on the aircraft, for producing various displays on indicators. Some of the indicators display the difference between the exact location of the aircraft and the ideal glide path. The last phase of the landing is performed by the pilot's use of either a radio altimeter or by his actual sight if the visibility permits his seeing the runway. The ILS are not accurate enough to furnish the exact information for guiding a plane to the point of its actual contact with the runway.

The radio altimeters are not capable of furnishing accurately the information necessary for the last phase of the landing operation, including actual contact with the runway, because they have a minimum error of plus or minus five feet. Moreover, such altimeters depend on the ground echo and, therefore, may give different measurements, or altitude indications, depending on the nature of the ground surface which produces the reflected electro-magnetic echo signals. For example, different indications will be produced when echoes are produced by hard rock surfaces, such as concrete runways, as compared to echoes produced by ground covered with vegetation. Also, since the ILS use a transmitter located at one end of the runway, it gives a variable accuracy from one end of the landing area to the other. In the systems of this type the volume of uncertainty is defined by a diverging cone whose apex is located at the antenna, and, therefore, the accuracy of such system is inversely proportional to the distance from the antenna. This basic limitation of such system cannot be solved by any means where the antenna is a point source since it is this source that determines the electromagnetic field pattern, which in turn determines as to whether or not the accuracy of the system will decrease in direct proportion to the distance from the antenna. The only solution to the above is to change the pattern of the electromagnetic field, and this is accomplished in the disclosed systems by using a line source of radiation rather than a point source. In such system, the accuracy of the indication remains constant throughout the lengths of the two nonresonant antennas used for producing right and left indications and also the elevation as produced by an analogue computer.

The disclosed radio landing system is capable of giving the necessary landing information for both manual landing and automatic landing of the aircraft, once the aircraft has approached the landing area and is within a few miles of the airfield. This information also includes the data for actual touching of the runway by the aircraft. This is accomplished by providing an indication of the difference between the distance from an aircraft to each side, or longitudinal edge, of the runway and the distance from the aircraft to the nearest point on the center line of the runway. The disclosed system maintains the same accuracy throughout the landing area and throughout the length of the runway and is capable of indicating the lateral position of the aircraft with respect to the runway and the slant range of the aircraft from the beginning of the runway with greater accuracy than what is required for proper blind landing.

The disclosed system uses three non-resonant antennae located on the ground and extending through the entire length of the runway. The first antenna is placed along the longitudinal axis of the runway; the second is placed along, and parallel to the left edge ("left antenna") of the runway; the third antenna is placed along, and parallel to, the right edge ("right antenna") of the runway. The left and right antennae are connected to a common transmitter which transmits a continuous series of signals over each antenna, the signals from the left antenna alternating with the signals from the right antenna. An airborne receiver receives both series of signals. The first series of signals, say, from the left antenna, is used for synchronizing the phase of a local oscillator, and the phase of the output of the local oscillator is compared with the phase of the signals from the right antenna. The results of such phase comparison produce an indication on a phase meter corresponding to the lateral position of the aircraft with respect to the longitudinal axis of the runway, i.e., whether the aircraft is in a central vertical plane passing through the axis of the runway or to the right or left of such plane. The right and left signals produced by the phase meter may be used for actuating servo-motors for automatic landing of the aircraft.

The central, or the first antenna is used for indicating the slant range of the approaching aircraft from the nearest end of the runway, this slant range becoming the vertical distance between the runway and the aircraft when the aircraft is directly above the corresponding end of the runway. This range, or vertical distance indication appears on a phase meter which is connected to an aircraft transmitter and receiver. One end of the first antenna is connected to a ground transmitter which transmits a continuous signal having a radio frequency $f_1$, to the air-borne receiver tuned to the frequency $f_1$. The opposite end of the first antenna is connected to a ground receiver which receives signals from the airborne transmitter sending a continuous signal of a radio frequency $f_a$. The received signal $f_a$ is impressed on a phase adjuster. The phase adjuster then impresses its output on the ground transmitter through a shielded return line whose length is equal to the length of the runway. The ground transmitter multiplies the frequency $f_a$ to the higher frequency $f_1$ which is transmitted, as mentioned previously, over the same first or central antenna to the airborne receiver. The airborne phase-meter, which is connected to the airborne receiver and transmitter, therefore measures the difference in phase between the transmitted signal $f_a$ and the received signal $f_1$. This phase measurement corresponds to twice the slant range or twice the vertical distance between the aircraft and the point on the first antenna nearest to the aircraft. Since the above type of altitude measurement does not depend on electro-magnetic echo signals, but uses instead two direct signals $f_1$ and $f_a$, the distance measurements have a higher accuracy than the known altimeter systems using echo signals.

The invention also discloses modifications of the above systems.

It is an object of this invention to provide a radio landing system for aircraft, said system having three non-resonant antennae located on the ground and extending through the length of the runway for obtaining the lateral and the altitude positions of the incoming aircraft with respect to the runway selected for receiving the descending aircraft.

It is also an object of this invention to provide the radio landing system of the above type in which the three antennae extend at last through the length of the runway, with the first antenna being in the vertical plane passing through the longitudinal axis of the runway, the second antenna being to the left and the third antenna being the same distance to the right of said vertical plane and parallel to said plane.

Still another object of this invention is to provide a radio landing system of the above type in which said second and third antennas are connected to a ground transmitter which alternately transmits signals first with the aid of the second antenna and then by means of the third antenna, and an airborne receiver which receives all of these signals and produces useful visual indications and signals for controlling the lateral position of the aircraft with respect to the vertical plane passing through the longitudinal axis of the runway.

Still another object of this invention is to provide the radio landing system of the above type having a land transponder connected to the first antenna and an airborne transponder, the two transponders furnishing a visual indicating and control signals at the airborne transponder for controlling the altitude of the aircraft during its landing path, including the rapidly decreasing altitudes just preceding the actual contact with the runway.

It is an additional object of this invention to provide a radio landing system for aircraft for guiding the aircraft to an airport runway, said system including first, second and third parallel ground antennas, the second antenna being in a vertical plane passing through the longitudinal axis of the runway and being either coaxial with the longitudinal axis or being parallel thereto, and the first and third antennas being on the respective sides of are runway and equally spaced from the longitudinal axis, transmitter means for sequentially transmitting signals by means of said antennas, and an airborne receiver for receiving the signals from said antennas and producing indications of the lateral position and altitude of the aircraft with respect to the runway.

The novel features which are believed to be characteristic of the invention, both to its organization and method of operation thereof, together with the further object and advantage thereof, will be better understood from the following description taken in connection with the accompanying drawings in which the several embodiments of the invention are illustrated as the examples of the invention. It is to be expressly understood, however, that the drawings are for the purpose of illustration and description only and are not intended as a definition of the elements of the invention. Referring to the drawings:

Figure 9:
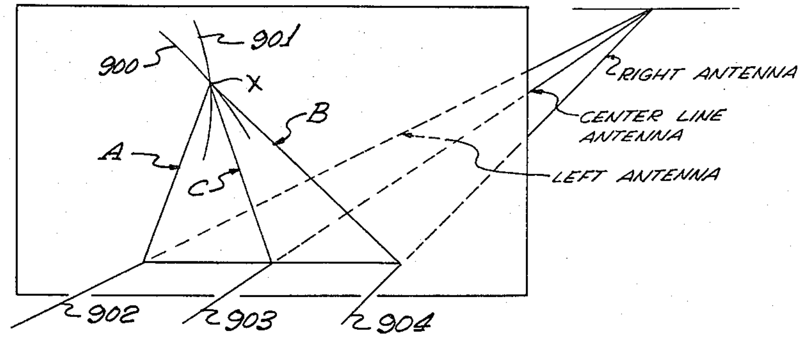
Figure 10:
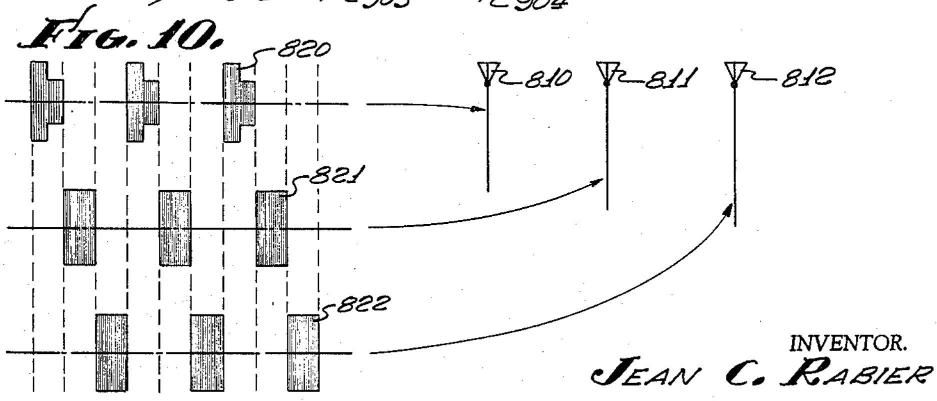
Figure 8:
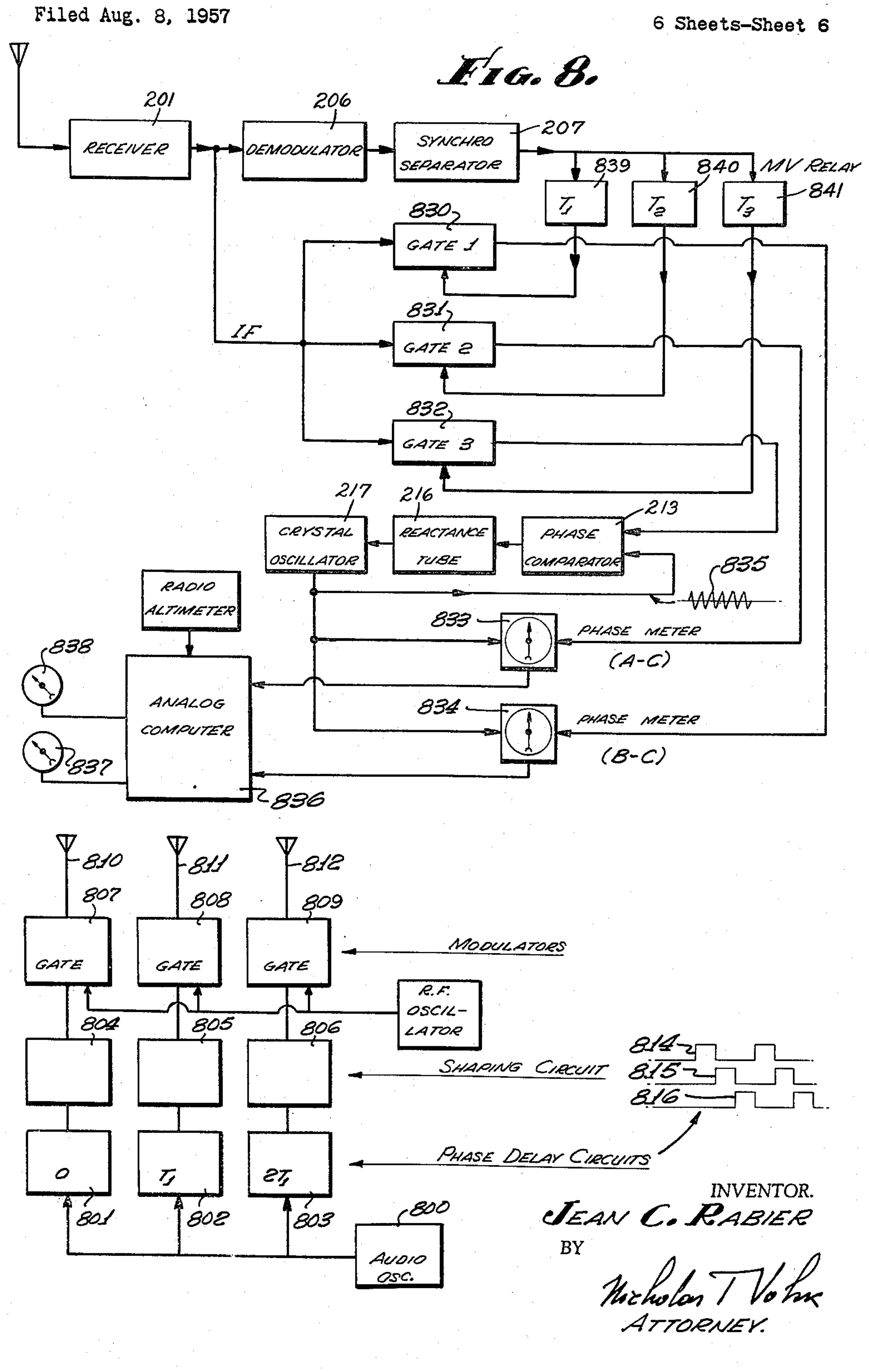

Figure 6*a* is the vertical field pattern produced by two azimuth antennas;

Figures 7*a* through 7*d* are the vertical sections indicating the position and the type of mounting of the non-resonant antennae conductors on the ground;

Figure 8 is a block diagram of the modified version of the landing system which will be called here as the double hyperbolic system, utilizing three non-resonant antennae;

Figure 9 illustrates the lateral position and range vectors obtainable with the double hyperbolic system;

Figure 10 illustrates oscillograms of signals applied to the three transmitter antennae illustrated in Figure 8.

Figure 2:
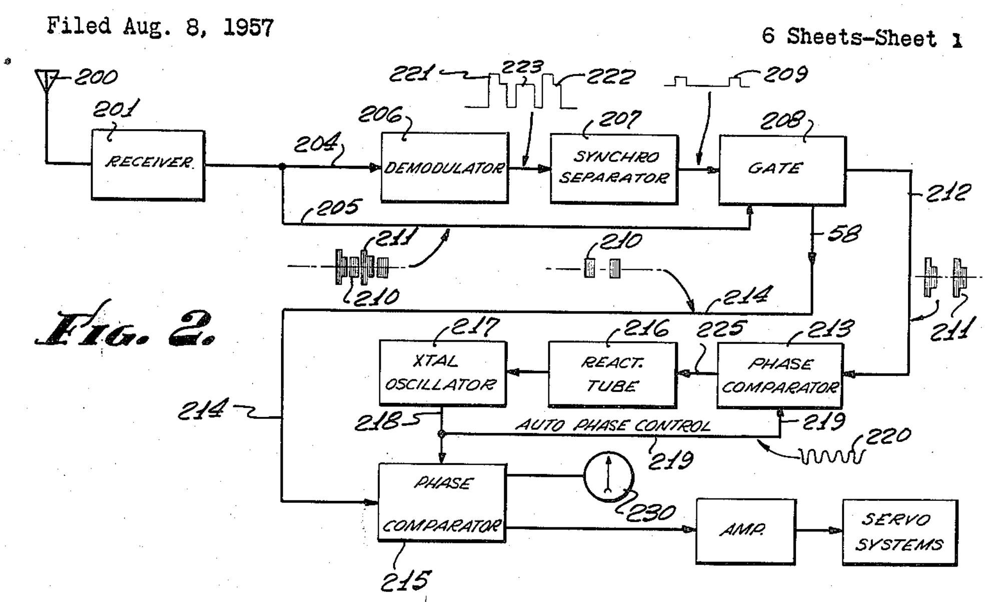
Figure 2 is a block diagram of an airborne receiver for lateral measurements.
Figures 1, 1A:
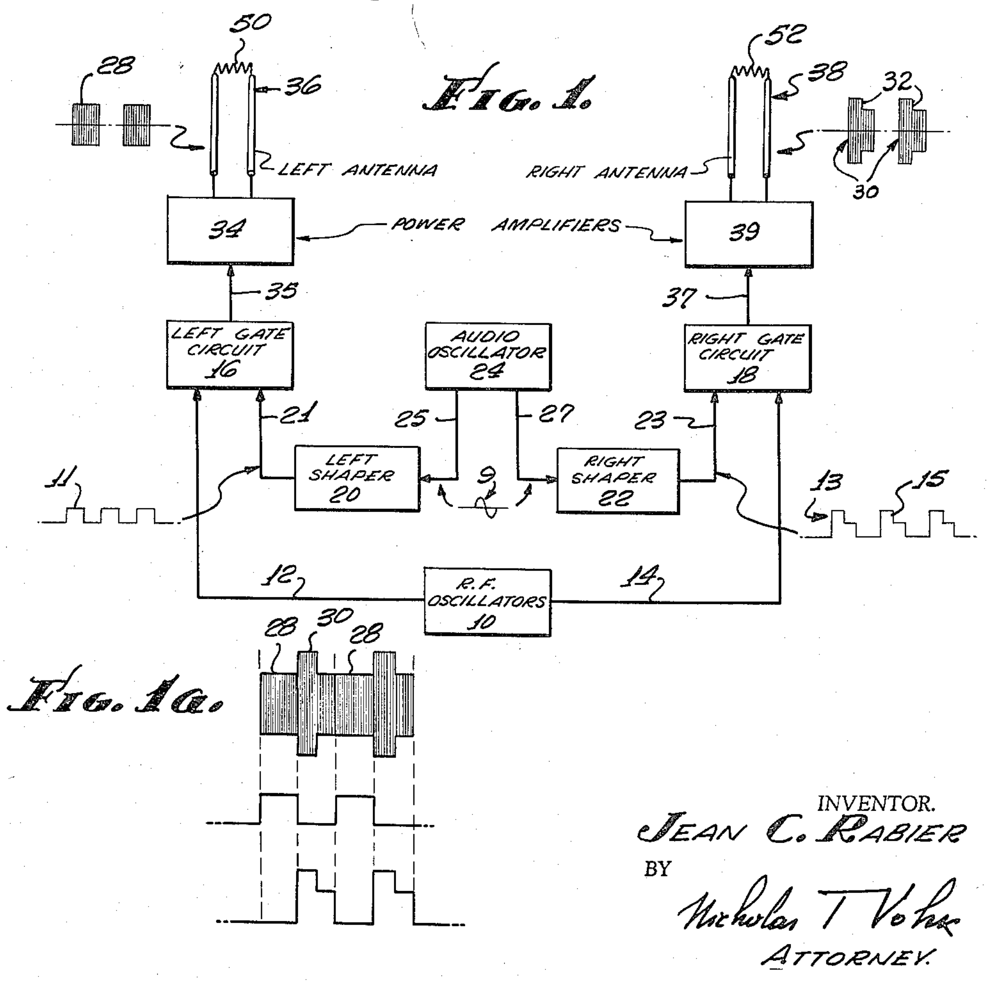
Figure 1 is a block diagram of a land transmitter for lateral measurements.

Referring to Figure 1, it illustrates the block diagram of the ground transmitter which is used in connection with the airborne receiver whose block diagram is illustrated in Figure 2. The transmitter and receiver furnish the lateral position of the aircraft with respect to the longitudinal axis of the runway and, for this reason, may be called as the azimuth transmitter and receiver. When the aircraft is in the vertical plane passing through the longitudinal axis of the runway, the indicating instrument may have a zero reading (azimuth is equal to 0°), and it may indicate, in degrees, the amount of deviation of the aircraft to the left or right from the above plane. The above type of azimuth indication is obtained with the aid of the ground transmitter shown in Figure 1, the airborne receiver shown in Figure 2, and two non-resonant antennae shown in Figures 1, 6 and 7. Referring again to Figure 1, a radio frequency oscillator 10 is connected over conductors 12 and 14 to two gate circuits 16 and 18. The gate circuit may be a vacuum tube which is made conductive in response to square wave 11 (or 13) periodically impressed upon it by the left shaper 20 over conductor 21 or the right shaper 22 over conductor 23. The inputs of the shapers are connected to a local audio-oscillator 24 over conductors 25 and 27. The output of the gate circuits 16 and 18 are impressed on power amplifiers 34 and 39 over conductors 35 and 37. The output of the power amplifier 34 is connected to a non-resonant left antenna 36, while the output of the amplifier 39 is connected to a non-resonant right antenna 38.

The sinusoidal wave 9, generated by the audio oscillator 24 is impressed on the wave-shaping circuits 20 and 22 which produce in their outputs rectangular waves 11 and 13. The rectangular waves 11 and 13 are synchronized with the sinusoidal wave 9. The phase of the rectangular pulses 11 is 180° out of phase with the pulses 13 so that when pulses 11 are "on," pulses 13 are "off." Therefore, the gate circuits 16 and 18 are alternately conductive. The pulses 13 also include an enlarged amplitude portion 15 which acts as a synchronizing pulse in the receiver shown in Figure 2. The right shaper 22, therefore, will require a pulse-forming circuit with two multivibrators and an adder circuit for producing the wave form shown at 13. When the gate-actuating pulses 13 and the continuous radio frequency signal from oscillator 10 are impressed on the gating circuit 18, the output of the gating circuit will have the wave shape illustrated at 30. This wave is amplified in amplifier 39 and transmitted with the aid of the non-resonant antenna to an airborne receiver 201, Figure 2. The radio frequency signal transmitted by antenna 36 is illustrated at 28.

Its overall shape corresponds to the wave-shape of the rectangular gate-signal 11. The oscillograms of the signals, 28 and 30 illustrated in Figure 1*a*, also indicate that they are 180° out of phase.

The operation of the ground transmitter is as follows: Oscillator 10 generates a continuous wave, the frequency of which may be in the order of five megacycles or less. This frequency is selected so as to obtain a minimum amount of attenuation in the non-resonant antennae and the desired effective range of the system. The wavelength of the radio frequency signal should also be longer than the width of the runway, as pointed out later at the end of the specification. The continuous radio frequency wave is received by the right and left gate circuits which are synchronized through the audio oscillator 24.

The two waves 28 and 30, which are 180° out of phase, should have a different form for separating them in the airborne receiver. Signal 30 is illustrated as having an enlarged amplitude 32. For the purpose of this invention the difference in the two signals 28 and 30 may take several forms; for example, the duration of signal 30 may be longer than the duration of signal 28 ("pulse length modulation") in which case the amplitudes may be identical. Pulse-separating systems of this type are known in the art and, therefore, need no further description. The disclosed system does require the difference in the wave-form of the two signals and separation of the two signals in terms of time, although partial overlapping between the two signals can be tolerated.

Figure 6:
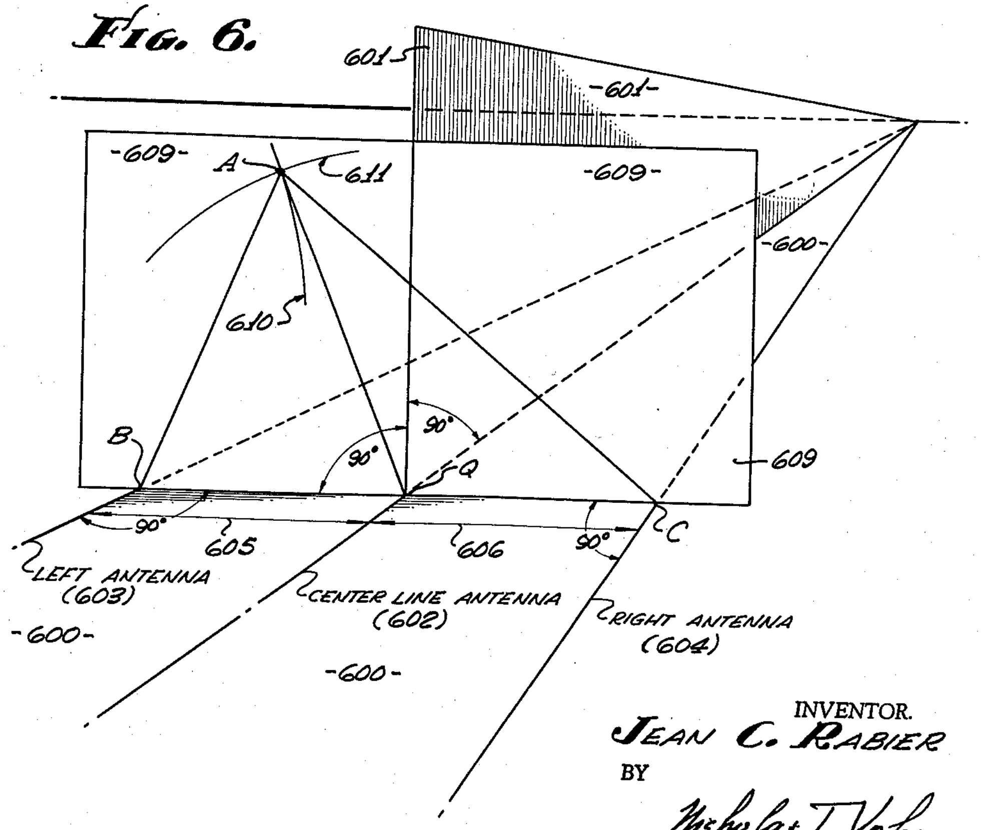
Figure 6 is an explanatory figure illustrating, in a prospective view, the disposition of the three antennae with respect to the runway.
Figure 7A:
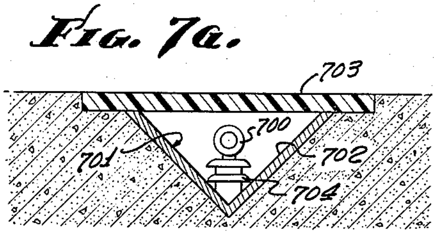
Figure 7B:
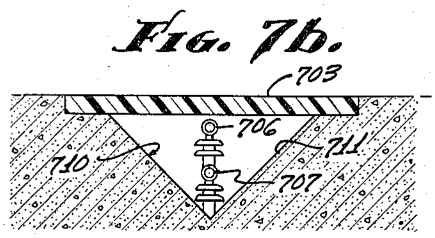
Figure 7C:
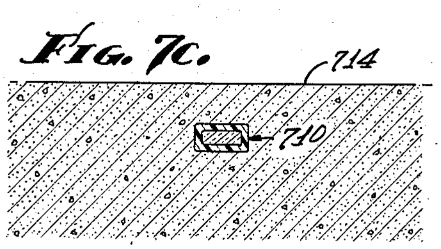
Figure 7D:
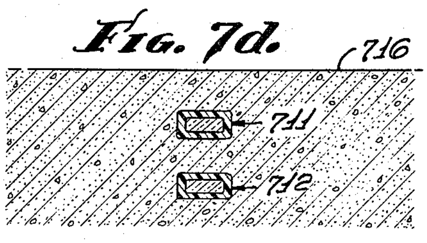

The azimuth antennae 36 and 38 are two non-resonant antennae because it is necessary to have the same phase relationship in both antennae at the points such as points B and C in Figure 6; these points correspond to the intersection of the antennas 603 and 604 by a vertical plane 609 which is also perpendicular to the vertical plane 601 passing through the center of runway 600. There may be an infinite number of points B and C as plane 609 is made to move from one end to the other end of the runway and along the lengths of the antennas 603 and 604, which correspond to the antennas 36 and 38 in Figure 1. Such phase relationship between the two signals 28 and 30 impressed on the non-resonant antennas 36 and 38, respectively, is necessary because the azimuth measurements depend directly on the phase relationship of these two signals after they reach the airborne receiver. When the phase relationship at points B and C is the same, then the phase meter of the airborne receiver will read zero when the plane is midway between the two antennas 36 and 38, which is the basis of operation of the disclosed system for obtaining the "right" and "left," or the azimuth indications. This will be explained more in detail later with the aid of Fig. 6. Antennae 603 and 604 are positioned along, and parallel to, the two sides of runway 600. These two antennae may also be positioned some distance away from the runway, but they must be parallel to the center line 602 of the runway and spaced an equal distance from the center line 602. Therefore, distance 605 must be equal to distance 606 for proper indication of the lateral position, or azimuth, of aircraft with respect to the central vertical plane 601. The two azimuth antennae also should extend at least through the length of the runway, and, if an earlier azimuth indication is desired, the antennae may extend beyond the runway along the continuations of the two straight lines defined by the antennae 603 and 604. The antennae should be mounted close to the ground of the runway, and in order to protect them from damage, it is preferable to place them below the level of the ground, as indicated in Figures 7*a* through 7*d*. In Figure 7*a*, the antenna is represented as a single conductor 700 placed in a ditch having a triangularly-shaped cross-section defined by two metal sides 701 and 702 and a dielectric cover 703. Conductor 700 is supported by an insulator 704. In Figure 7*a*, the antenna is an unbalanced type antenna since only one conductor is used, and the radiation pattern is obtained from the field produced between conductor 700 and the metallic sides 701 and 702. In Figure 7*b*, the antenna is a balanced antenna, using two conductors 706 and 707 terminating in a characteristic terminal impedance, and, therefore, the gutter sides 710 and 711 may be made of any nonconductive material, such as concrete. In Figures 7*c* and 7*d*, the unbalanced and the balanced antennas are represented by insulated conductors 710 and 711 and 712, respectively, which are imbedded in ground or concrete below the surfaces 714 and 716 of the airport field, adjacent to the runway 600. In all cases, the conductors are properly terminated in characteristic impedances illustrated diagrammatically at 50 and 52 in Figure 1 to produce a standing wave field pattern throughout the lengths of the azimuth antennas.

The block diagram of the airborne receiver which receives the signals from antennae 36 and 38 and produces the "right" and "left," or the azimuth, indications on a meter 230 is shown in Figure 2. An antenna 200, which may have its lobe directed toward ground, if it is a directional antenna, is connected to a receiver 201 which includes the known radio frequency amplifier, demodulator and intermediate frequency amplifier. The output of receiver 201 is connected to a demodulator 206 over a conductor 204 and to a gate circuit 208 over a conductor 205. Demodulator 206 is connected to a synchronizing signal separator 207 which blocks all signals but the synchronizing portion 221 of signal 222. The synchronizing signal then appears as a rectangular wave 209 in the output of separator 207. The separated synchronizing signals 209 are impressed on a gate circuit 208 which also receives the intermediate frequency signals 210 and 211 over conductor 205. Gate circuit 208 is a double gate circuit. Its function is to receive the signals 209, 210 and 211, separate the signals 210 from the signals 211, and impress signals 211 on a conductor 212 and signals 210 on conductor 214 and phase comparator 215. The double gate circuits are known in the art and need no additional description. It may include two pentode tubes having their control grids connected to conductor 205 to receive the signals 210 and 211. The second grid in one tube may be connected to the synchronizing signals separator and the positive output signals 209 are made sufficiently wide so that the pulse width of pulses 209 is made equal to the width of pulses 210 or 211. Accordingly, pentode #1 will be made conductive only when pulses 209 and 210 (or 211) are impressed on the two grids. The same type of circuit can be used for the synchronizing pulses 209 so as to make the second pentode conductive when the first pentode is non-conductive.

The phase of signal 210 is to be compared with the phase of 211. However, since the received signals 210 and 211 alternate in sequence, signal 211 will be "off" when 210 is "on" and vice versa. Therefore, it is necessary to generate a local signal during the time when the received signal 211 is off which will have identical phase as signal 211. To accomplish this, a local continuous wave 220 is generated by crystal oscillator 217 having its phase controlled by the received "burst" of signal 211 so that it phase will be identical with that of 211. The continuous wave signal 220 then replaces signal 211 in the actual phase comparison accomplished by phase comparator 215. This local continuous wave signal 220 will be utilized during the time when signal 210 reaches the phase comparator circuit 215 of the airborne equipment. The phase of continuous signal 220 is controlled to maintain the same phase as the phase of signal 211 by comparing the output of crystal oscillator 217 with received signals 211. Continuous wave 220 is impressed on the phase comparator circuit 215 over a conductor 218, and on a phase comparator 213 over a conductor 219. Comparator circuit 213 is also connected over conductor 212 to the double gate circuit 208. The phase comparator 213, therefore, receives signals 211 and continuous wave 220 and produces a variable direct current bias signal the amplitude of which is proportional to the phase difference between pulses 211 and continuous wave 220. The phase comparator circuits per se of the above type are known in the art. They may consist of a phase demodulator in which one signal is impressed in parallel on two grids of a push-pull circuit, while the second signal is impressed on the same grids in series with the result that the output is proportional to the product of the two signals. There is a large number of known circuits of the above type, and, therefore, their detailed description is not necessary.

The variable direct current bias appearing on conductor 225 is impressed on a reactance tube 216 which constitutes a part of the tank circuit of the crystal oscillator 217. The reactance tube circuits are known and generally comprise an amplifier which acts as a variable impedance with respect to the tank circuit of the oscillator.

The phase of the continuous wave 220, therefore, is constantly controlled by the phase of signal 211. This phase-controlled wave 220 is impressed on the phase comparator circuit 215, where it is compared with the phase of signal 210. It is this phase comparison that finally gives the left and right, or the azimuth, positions of aircraft with respect to the vertical plane 601, Figure 6.

In Figure 6, the aircraft is indicated to be at point A. Point A is located to the left of plane 601, and therefore, it is closer to antenna 603 than to antenna 604. If a transverse vertical plane 609 is drawn through point A, it will intersect antennae 603 and 604 at points B and C. This plane is at right angles to plane 601, runway 600, and antennae 603 and 604. The slant ranges to the antennae are indicated by lines AB and AC in Figure 6, which lie in plane 609. The phase comparator 215 in Figure 2 indicates the difference in the lengths of the triangle sides AB and AC. When these sides are equal to each other, point A is lying in plane 601, and the aircraft is directly in line with the center of the runway represented by the longitudinal axis 602.

The transmitter of Figure 1 and receiver of Figure 2, therefore, give a pilot an indication of his lateral position with respect to the vertical plane 601, bisecting the runway 600, in terms of right, left, and zero readings on phase meter 230.

In Figure 6, the position of point A has been chosen as being over the runway 600. However, the lateral measurement system of Figures 1 and 2 is also capable of giving the lateral indication of the aircraft when it is approaching the runway and is a few miles away from the runway. The range of the lateral indication system depends on the radiation field pattern of a non-resonant antenna and the power impressed on the antenna. It is also a function of the ratio between the length of the antenna and the wave-length of the signal. In general, a suitable range of the disclosed system is of the order of 10 miles. This range may be increased by increasing the power of the transmitter. However, the inaccuracy of the system increases with the increase in range, and therefore, there is a practical limit to the useful range of the system. The disclosed systems, of course, have the same accuracy limitations as the ILS systems beyond the end of the non-resonant antennas, but there is less difficulty in creating stable electromagnetic field patterns at low angles from the ground.

*Range of altitude measurements.*—The ground transmitter of Fig. 1 and receiver of Fig. 2 furnish a reading on phase meter 230 in terms of a difference in lengths of the two transmission paths AB and AC, Figure 6. The phase meter 230 thus indicates the position of point A with respect to the central or longitudinal, vertical plane 601 in terms of a deflection of the meter needle to the right or left of the central, zero position, zero reading on the meter corresponding to the position of aircraft A in plane 601.

The above information should be supplemented with the range, or altitude, information with respect to runway 600. When aircraft A is not in the vertical plane 601, the distance between point A and point Q on center line 602 becomes a slant range AQ; when point A is in plane 601, slant range AQ becomes the altitude of aircraft A above the runway 600, and more particularly, the vertical distance of point A above the central axis 602 on the runway. This information is furnished by a ground transponder and an airborne transponder disclosed in Figure 3. The two transponders constitute a range-measuring system, which becomes an altimeter when aircraft is in the longitudinal plane 601 and is above the runway.

Figure 3:
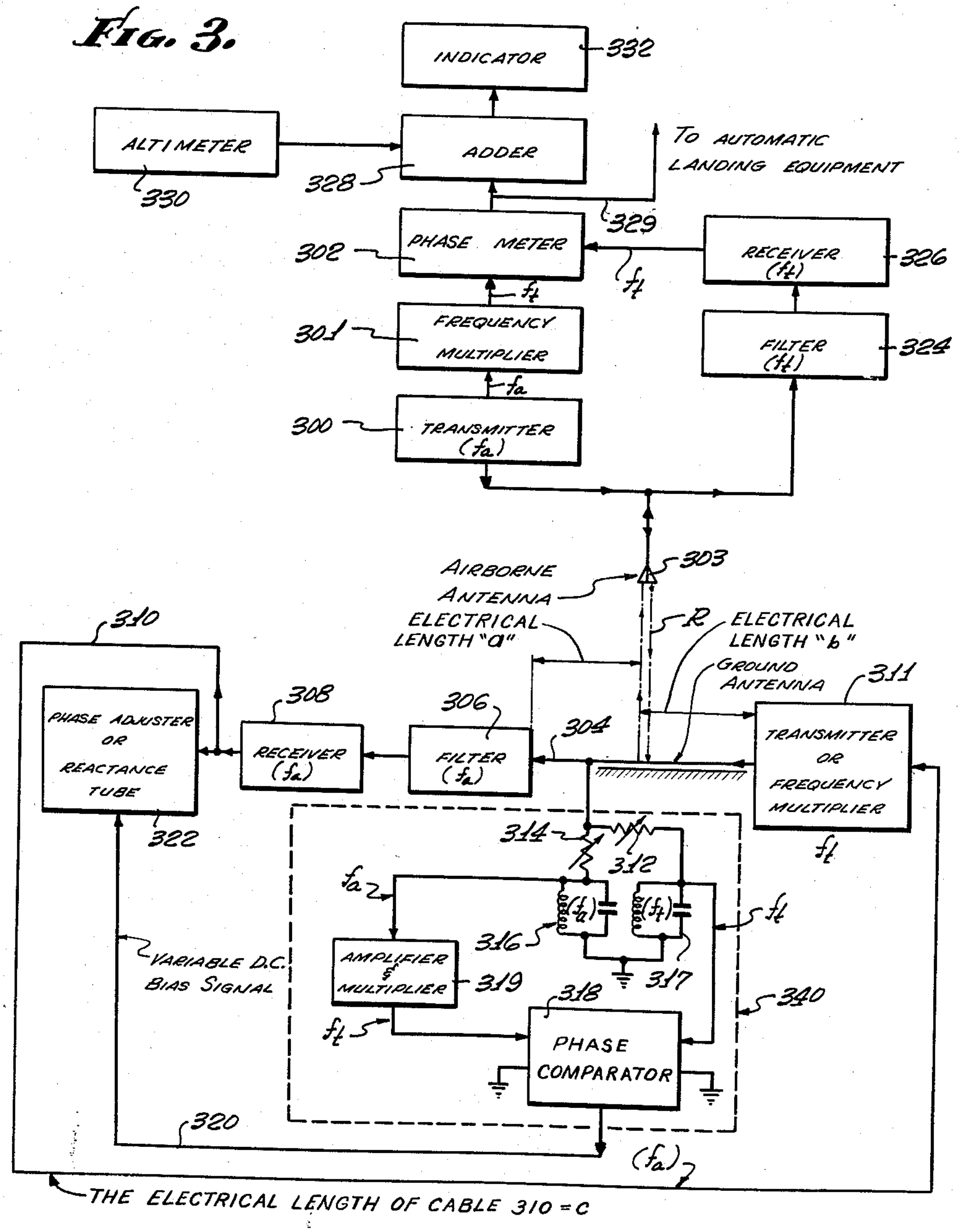
Figure 3 is a block diagram of a system for indicating the range to the aircraft from a non-resonant antenna located along the center line of the runway, and also for indicating the altitude when the aircraft is in a vertical plane over the antenna.

Referring to Figure 3, the airborne equipment includes a transmitter 300 transmitting a continuous radio frequency wave $f_a$ over an antenna 303. Transmitter 300 is also connected to a frequency multiplier 301 which changes frequency $f_a$ to $f_t$ and impresses it on a phase meter 302. Antenna 303 also receives a continuous wave signal $f_t$ from the ground transmitter 311 and impresses it on a filter 324. Filter 324 transmits the received signal to a receiver 326.

The output signals of receiver 326 and frequency multiplier 301 are impressed on a phase meter circuit 302. The output of phase meter 302 is connected to an adder 328 and a conductor 329. Conductor 329 is connected to an automatic landing equipment which may include an analogue computer, not shown. Adder 328 is also connected to an altimeter 330 which furnishes the altitude of point A above ground. This altimeter receives its information independently of the two transponders. The output of the adder circuit 328, which is proportional to the difference between the altitude signal produced by altimeter 330 and the range signal produced by phase meter 302, is impressed on an indicator 332 which indicates the above difference. When point A is in plane 601, the altitude signal should be equal to the range signal produced by phase meter and the difference between the two signals is equal to zero. Therefore, the reading indicates that the aircraft is directly above antenna 304 and is in plane 601.

The continuous wave signal $f_t$ is transmitted by a ground transmitter 311 in response to the received signal $f_a$ by a ground receiver 308. Receiver 308 is connected to a filter 306 which transmits frequency $f_a$ but blocks frequency $f_t$ transmitted by transmitter 311. Receiver 308 and transmitter 311 are connected to a common non-resonant antenna 304 which is located along the longitudinal axis 602, Figure 6, of the runway 600 and extends through its entire length. Receiver 308 is connected to a phase adjuster circuit 322 which is a reactance tube whose conductivity is controlled by a phase discriminator 318 to which it is connected over a conductor 320. Phase discriminator 318 is connected to two tuned circuits 316 and 317 which are connected through resistors 314 and 312 to antenna 304. Circuit 316 is tuned to a frequency $f_a$, and circuit 317 is tuned to frequency $f_t$. An amplifier and multiplier circuit 319 is connected between tuned circuit 317 and comparator 318. Phase discriminator 318 produces a variable direct current bias signal in its output which is impressed on the control grid of reactance tube 322 so as to control its impedance as a function of the phase difference between $f_t$ and $f_a$ as these two frequencies appear at the phase comparator 318.

Conductor 310 connects the output of receiver 308 to transmitter 311, which is a frequency multiplier. Transmitter 311 should be a frequency multiplier, which multiplies $f_a$ by some whole number such as 2, if the airborne phase meter 302 is to be calibrated so as to read zero when the aircraft touches ground and the aircraft is also in the middle of the runway. In order to obtain such calibration, the electrical length of $$a+b+c=n\lambda_a \quad (1)$$

where $n$ is any whole number and $\lambda_a$ is the wave length of signal $f_a$.

The meaning of Equation 1 is that it is necessary to eliminate the electrical phase shift introduced by the loop of the ground transponder, which includes conductor 310 (C) and antenna 304 ($A+C$). This is necessary so that this electrical phase shift would not add to the range reading on the phase meter 302. This meter should indicate only the sought after range. Actually the system always measures 2R because the signal transmitted by the airborne transmitter 300 travels to the ground receiver 308 and this signal then produces the second signal from transmitter 311, these two signals both traveling along the same path R.

As to the relationship between $f_a$ and $f_t$, it is necessary to measure the phase relationship at the airborne receiver between the transmitted and received signals ($f_a$ and $f_t$) and this can be accomplished most readily when $$kf_a=f_t \quad (2)$$

where $kf_a$ is any whole number or the ratio of the two whole numbers.

For example, $2f_a=f_t$. Phase adjuster 322 and phase comparator 318 can be eliminated if phase meter 302 is calibrated to give zero reading when range R is equal to zero even though the phase of the two $f_t$ signals impressed on meter 302 is such as to produce a current in the meter.

The operation of the range measuring system is as follows: transmitter 300 transmits a continuous signal having a frequency $f_a$. It is received by receiver 308. The phase of the output signal impressed by receiver 308 on the return line 310 is automatically adjusted so as to satisfy Equation 1. The automatic phase adjustment is obtained by impressing the signal received by antenna 304 on the tuned circuits 316 and 317, phase discriminator 318 and reactance tube 322. An amplifier 319 is inserted between the tuned circuit 316 and comparator 318 in order to increase the amplitude of the received signal $f_a$ so that the phase of the two signals $f_a$ and $f_t$ could be compared conveniently in a common phase comparator circuit 318. Resistances 314 and 312 are used for decoupling the two tuned circuits from each other. The amplitude of the variable direct current bias signal appearing in the output of phase comparator 318 is such that Equation 1 is satisfied.

With the Equation 1 satisfied, the phase meter 302 will indicate the phase shift proportional to 2R.

Phase meter 302 is calibrated so as to give a direct reading of R rather than 2R.

Figure 5:
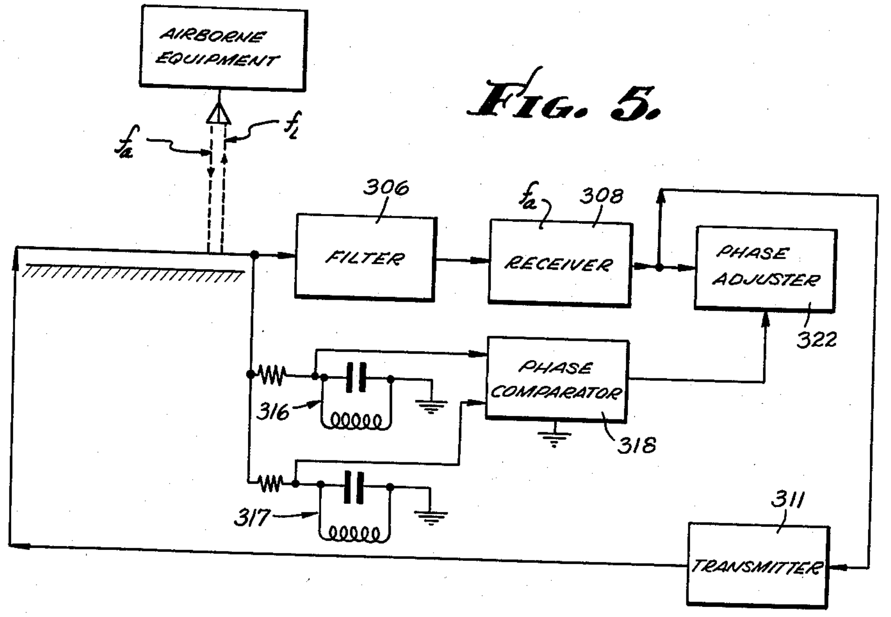
Figure 5 is block diagram of an additional version of the ground station for measuring distance from aircraft to the runway center line.

Fig. 5 illustrates a more convenient location of the transmitter 311 and receiver 308. In Fig. 5 they are located at the same end of the antenna and, therefore, can be constructed as a single unit.

*Range measurement to the end of runway.*—The altitude and range system disclosed in Figure 3 may also be used for obtaining range indications to the end of the runway by locating the ground receiver and transmitter next to the end of the runway, providing an additional directional antenna at the end of the runway, and automatic switching circuits for connecting the ground equipment first to a non-resonant antenna extending through the length of the runway for indicating the altitude of aircraft over the runway and then connecting the same equipment to the directional antenna for indicating the range.

Figure 4:
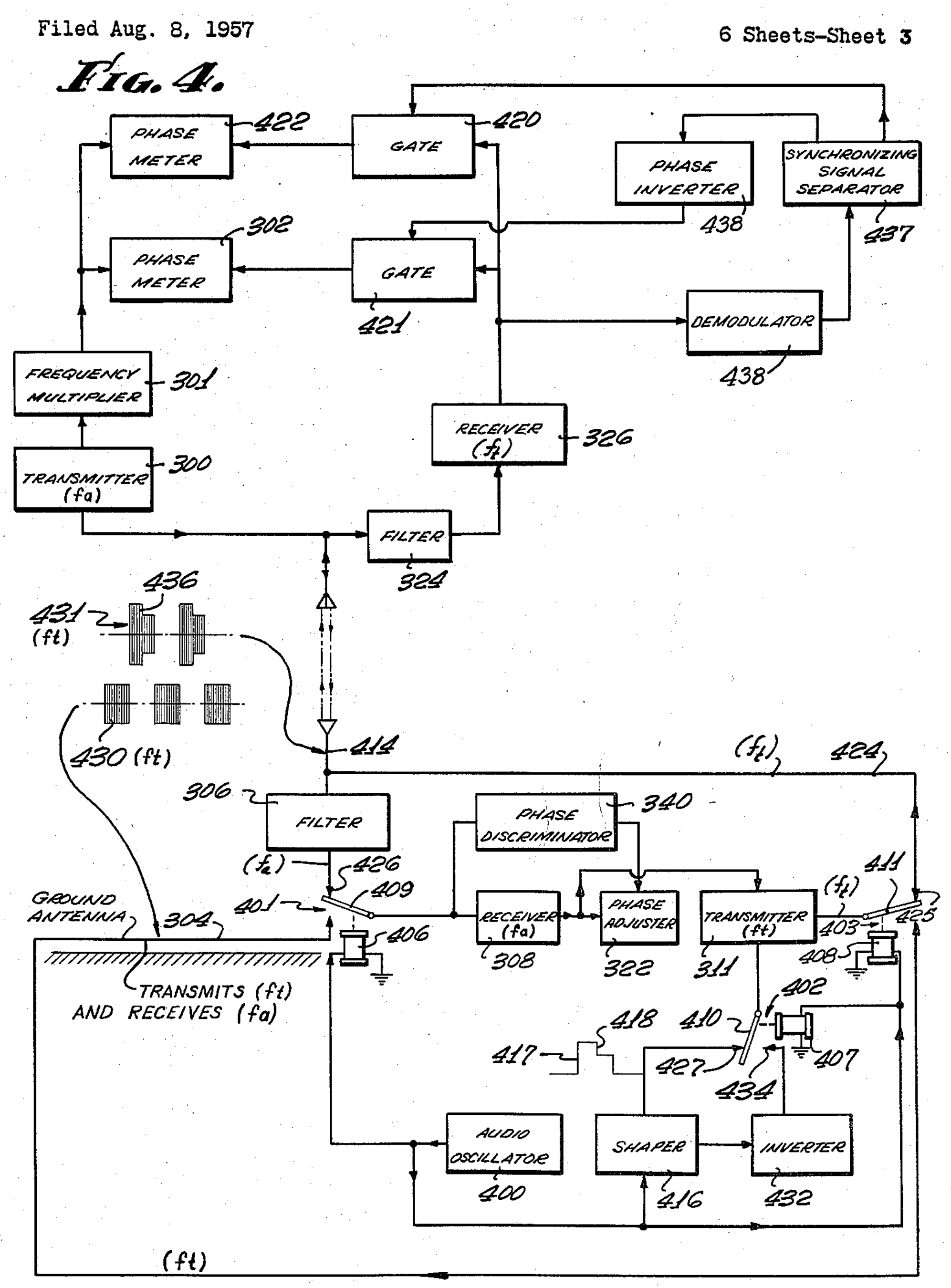
Figure 4 is a block diagram of another version of the range and altitude measuring ground station and of the airborne receiver.

The above modification of the altitude measuring system of Figure 3 is illustrated in Figure 4. In Figure 4, those elements of the system which are also present in Figure 3, are identified by the same numerals in Figure 4. Therefore, only the description of the switching system and of the range indicating circuits is necessary for completing the description of Figure 4. The switching system is controlled by an audio oscillator 400 which is connected to switches 401, 402 and 403. The switches include relays 406, 407 and 408 and armatures 409, 410 and 411. These switches, preferably, should be electronic switches rather than relays. Relays are illustrated in Fig. 4 for simplifying the description of this system. Armature 409 connects receiver 308 either to antenna 304 or to an antenna 414 which is the directional antenna located at the end of the runway and is used for indicating the slant range between aircraft and the end of the runway. Audio oscillator 400 is also connected to a wave-shaping circuit 416 which produces a composite rectangular wave 417 having an enlarged amplitude portion 418 which is used for synchronizing the operation of the airborne switching system including two gate circuits 420 and 421 which connect the output of receiver 326 first to phase meter 302 and then to phase meter 422. Phase meter 302 corresponds to the similarly numbered meter 302 in Figure 3, while meter 422 compares the phase of the continuous wave produced by frequency multiplier 301 and transmitter 300 with the phase of the signal from receiver 326, transmitter 311 and antenna 414, which is the range antenna. The gating circuit 420, therefore, should be made conductive when transmitter 311 is connected to antenna 414 through conductor 424 and armature 411, with armature 411 being on contact 425, armature 409 being on contact 426, and armature 410 on contact 427. These are the positions of the armatures shown in Figure 4, at which time phase meter 422 indicates the range of aircraft to antenna 414. When armatures 409, 410 and 411 are on the second set of contacts, receiver 308 and transmitter 311 are connected to antenna 304, the gate circuit 421 is made conductive, gate 420 non-conductive, and, therefore, transmitter 300 and receiver 326 become connected to phase meter 302 for indicating the altitude of aircraft above the runway. It should be noted here that meter 302 will indicate the altitude of the aircraft over the runway only when the aircraft is in plane 601, Fig. 1, and is over the runway. Prior to this position meter 302 will indicate a slant range to the nearest end of antenna 304. The range indication on meter 422 and the altitude (or range) indication on meter 302 both exceed the accuracy required for actual landing of aircraft on the runway.

The pulses of radio frequency $f_t$ transmitted by antenna 304 are shown at 430, and the pulses transmitted by antenna 414 are shown at 431 in proper phase relationship with respect to pulses 430. Pulse 430 is "on," while pulse 431 is "off." Since transmitter 311 includes on its input side a frequency multiplier for changing frequency $f_a$ to $f_t$ and the output of the multiplier is then impressed on an amplifier stage which is controlled by a shaper 416, for producing pulses 431, the multivibrator producing the base of rectangular wave 417 in the shaping circuit 416 is also connected to an inverter 432 which makes the amplifier stage in transmitter 311 conductive when armature 410 is on contact 434, thus making transmitter 311 to transmit pulse 430.

The switching system in the airborne equipment is controlled by the synchronizing portion 436 of signal 431 which is demodulated by demodulator 428 and separated from all other signals by the synchronizing signal separator 437 in the same manner as in Figure 2 by the separator 207. The signal from sychronizing signal separator 437 to gate 421 is inverted, via phase inverter 438, relative to the signal to gate 420. These signals are then used for alternately making the gate circuits conductive for transmitting the range signal 431 to meter 422 and the altitude signal 430 to meter 302 for indicating the range and altitudes on the respective meters.

*Single system for indicating lateral position of aircraft with respect to runway and its range from and altitude above the runway*

The systems described in connection with Figures 1 through 7 utilize two side antennae 36 and 38 for obtaining the lateral position of aircraft with respect to runway and central antenna 304 for obtaining first the range and then the altitude. These three non-resonant antennae may also be used in connection with a modified system in which the position of aircraft is determined by the intersection of two hyperbolic loci of the same type as the single hyperbolic locus 610 in Figure 6. In Figure 6, the position of point A is obtained by the intersection of the hyperbolic locus 610 and the circular locus 611 whose radius AQ corresponds to the slant range. The circular locus 611 may be replaced by the second hyperbolic locus and the intersection of the two hyperbolic loci 900 and 901 then determines the location of point X in Fig. 9. Locus 901, Fig. 9, is obtained by using antennae 811 and 812, Figure 8, and locus 900 is obtained by using antennae 812 and 810 in the system identical to that shown in Figures 1 and 2. In Figure 8, antennae 810, 811 and 812 correspond to the antennae 603, 602 and 604, in Figure 6. The advantage of such a system is that it provides the lateral and elevation measurements with only one type of airborne equipment and a single radio frequency channel between the land equipment and the airborne equipment. Such a system will be referred to in this specification as a "double hyperbola" system.

The system of this type is shown in Figure 8. This differs from that shown in Figure 1 only in that three channels are used in Fig. 8 instead of the two channels used in Figures 1 and 2. Both transmitter and receiver have three channels in Figure 8. Audio oscillator 800 impresses a sinusoidal wave on three phase delay circuits 801, 802 and 803, which, in combination with the shapers 804, 805 and 806, produce three gating signals 814, 815 and 816, which are 120° apart from the preceding signal. The transmitted signals are signals 820, 821 and 822 shown in Figure 10.

The transmitted signals are sequentially switched to corresponding gates 1, 2 and 3 by multivibrator relay 839–841 at times $T_1$, $T_2$ and $T_3$ and are separated in the gate circuits 830, 831 and 832. The signal from the gates 830 and 831 are impressed on the phase meters 833 and 834, respectively, where their phases are compared with the phase of the continuous wave 835, the phase of which is controlled by the output of gate 832. Phase meter 833 indicates the difference between the slant ranges A and C, Fig. 9, or $(A-C)$, while meter 834 indicates the phase difference between the signals which are received from antennae 812 and 811, which corresponds to the difference in the magnitudes of the slant ranges B and C, i.e. $(B-C)$ where A, B and C are indicated in Figure 9. The above results are obtained in the same manner as in Figure 2.

The "right" or "left" information is obtained by comparing the readings of the two meters 833 and 834 by means of the analogue computer 836 which operates the zero-center meter 837.

The range appears on a meter 838 which obtains its range reading from the computer and two input signals $(A-C)$ and $(B-C)$ impressed on the computer. It may be shown that the equation which must be solved by the computer is $$r=\frac{1/2-x^2-y^2}{2(x+y)}$$

where $$x=(A-C)$$

$$y=(B-C)$$

and $$r=\text{range}$$

The most suitable wave length for the azimuth and elevation determination is that which has a wave length longer than the width BC, Figure 6, of the runway. This is desirable to avoid ambiguity of indications which otherwise are apt to be greater than one wave length or more than 360° phase difference indicated on the phase meters. If the width of the runway is in the order of 200 feet (60 meters) then the wave length should be larger than 60 meters, i.e. a frequency under five megacycles. If because of other limitations relating to the assignment of available radio frequency spectrum, the above wavelengths cannot be used, it is also possible to use shorter wave lengths for transmission in which case the phase meters should work on a modulation carrier which will have a wave length in the order of 60 meters, or some comparable wave length which is greater than the width of the runways. The type of modulation of the carrier could be either an amplitude modulation or a frequency modulation, both of which are equally suitable for obtaining the sought indications. The same considerations apply to the elevation indications which should have a wave length longer than the contemplated highest altitude.

In the light of the above description, it follows that the disclosed radio landing systems are especially suited to serve as the landing systems capable of guiding airplanes to the airport runways after they have been guided to the vicinity of the airport by some other long range navigational systems. The long range systems are not capable of furnishing elevation and right and left positions with an accuracy of a few centimeters, while the landing system disclosed here can do so even to a few centimeters. Therefore, the disclosed system's accuracy exceeds that actually required for successful landing of aircraft up to and including the moment of actual contact between the runway and the landing gear of the aircraft.

As mentioned previously the accuracy of this system is in the order of a few centimeters as long as the aircraft is directly over the runway. When the aircraft is beyond the runway then, as also mentioned previously, the electromagnetic field pattern is identical to that found with the ILS systems and therefore the accuracy of the system decreases proportionately with the increase of the distance between the aircraft and the nearest end of the runway. It is obvious that under such conditions the disclosed systems have no advantage over the known ILS systems. Accordingly, the purpose of the disclosed systems is to land the aircraft on the runway, when the aircraft's pilot is not capable of seeing the runway because of adverse weather conditions, after such aircraft has been guided to the immediate vicinity of the runway by GCA or ILS systems, these latter systems being incapable of furnishing the right and left indications and the elevation indications of the order of a few centimeters.

What is claimed as new is:

1. A radio landing system for landing an aircraft on an airport runway, said system comprising left, right and central non-resonant antennas, said left and right antennas are being positioned on the left and right sides of said runway, respectively, in parallel relationship with respect to the longitudinal axis of said runway, and said central antenna being positioned along said longitudinal axis, the lengths of all of said antennas being at least equal to the length of said runway, ground transmitter means connected to said left, right and central antennas for transmitting first a first signal from the left antenna, then a second signal from the right antenna and a third signal from the central antenna, and an airborne receiver means for receiving at least said first, second and third signals, said receiver means having means, operated at least by said first and second signals, for producing a visual indication corresponding to an instantaneous lateral position of said aircraft with respect to the vertical plane passing through said longitudinal axis.

2. A radio landing system for guiding an aircraft toward an airport runway up to the point of actual touching of said runway by a landing gear of said aircraft, said system including first, second and third non-resonant antennas, said second antenna being positioned in a vertical longitudinal plane passing through the longitudinal axis of said runway, and at a level slightly below the surface of said runway, the length of said second antenna being at least equal to the length of said runway, said first and third antennas being equi-distantly positioned, respectively, on each side of said second antenna and having the same lengths as said second antenna, ground transmitter means transmitting first, second and third signals by means of said first, second and third antennas, respectively; airborne receiver means carried by said aircraft, said receiver means receiving at least said first and second signals, and phase comparison means connected to said receiver means and operated by the received first and second signals for indicating the lateral position of said aircraft with respect to said vertical longitudinal plane.

3. The radio landing system as defined in claim 2 in which said ground transmitter means also includes a ground range transmitter-receiver connected to said second antenna, said ground range transmitter transmitting a first continuous wave range signal, and said airborne receiver means also included an airborne range transmitter-receiver for receiving said range signal on said airborne range receiver and transmitting a second continuous wave range signal to said ground range receiver, and phase-measuring means connected to said airborne range transmitter and said airborne range receiver for indicating the range of said aircraft to said second antenna.

4. The radio landing system as defined in claim 3 which also includes an airborne altimeter, an adder circuit connected to said phase-measuring means and said altimeter, and means responsive to a signal appearing in the output of said adder for indicating the arithmetic difference in the absolute magnitude between the signals impressed on said adder.

5. The radio landing system as defined in claim 3 in which said second ground transmitter includes means for maintaining the frequency of the first range signal at a frequency $f_t$ equal to $kf_a$, where $f_a$ is the frequency of the second range signal, and K is any whole number, beginning with 2 or the ratio of any two whole numbers.

6. The radio landing system as defined in claim 5 in which said second ground transmitter-receiver also includes means for maintaining said signal $f_t$, as it appears at any given point on the second antenna, in fixed phase relationship with respect to said signal $f_a$, as it appears at the same point on said second antenna.

7. The radio landing system as defined in claim 5 in which said ground range transmitter-receiver also includes phase-adjusting means for maintaining said signal $f_t$ in such phase relationship with respect to $f_a$, as $f_t$ and $f_a$ appear at any given common point along the length of said second antenna, that if $f_t$ were equal to $f_a$, then both signals would have been directly in phase at said common point, said in-phase relationship and said phase-adjusting means eliminating the electrical delay existing between said receiver and said transmitter as seen by said second antenna.

8. A radio landing system capable of furnishing visual information to a pilot for proper landing of an aircraft on an airport runway, said system including a ground transmitter, first, second and third non-resonant antennas connected to said transmitter, all of said antennas extending at least through the length of said runway and being located substantially along the surface of said runway; said second antenna lying in the central vertical plane passing through the longitudinal axis of said runway, and said first and third antennas lying in the respective first and third vertical planes parallel to and equidistantly laterally spaced from the central plane, whereby said first antenna is parallel to and is on one side of said runway, and said third antenna is parallel to and is on the other side of said runway, a transmitter having first, second and third transmission channels connected to said first, second and third antennas, respectively; said channels transmitting, respectively, first, second and third series of sequentially spaced reiterative signals, an airborne receiver having first means for receiving said signals and producing a continuous wave signal in response to said first signal, second means for amplifying and transmitting only said second signal and rejecting said first and third signals, third means for amplifying and transmitting only said third signal, a first phase meter connected to said first and second means, and a second phase meter connected to said first and third means.

9. The radio landing system as defined in claim 8 in which said airborne receiver also includes an altimeter, an analogue computer connected to said altimeter and to said first and second phase meters, a range meter connected to the output of said computer, and left-and-right meter connected to the output of said computer, said last meter indicating the lateral position of the aircraft with respect to said central plane.

10. The radio landing system as defined in claim 8 in which said land transmitter includes first, second, and third sources of gate signals connected to the respective gate circuits for sequentially gating said gate circuits.

11. The radio landing system as defined in claim 8 in which said first, second and third antennas are each mounted below the top elevation of said runway.

12. The radio landing system as defined in claim 11 in which said first, second and third antennas are balanced non-resonant antennas.

13. The radio landing system as defined in claim 11 in which said first, second and third antennas are unbalanced, non-resonant antennas.

14. A radio landing system for furnishing visual indications to a pilot of an aircraft in the course of its landing on a runway, said system including at least first, second, and third non-resonant parallel antennae; said second antenna lying in a vertical plane passing through the longitudinal axis of said runway, said first antenna being laterally spaced from said second antenna beyond one longitudinal edge of said runway, and said third antenna being laterally spaced from said second antenna beyond the other longitudinal edge of said runway, said first, second and third antennas lying in the same horizontal plane and extending at least through the length of said runway; a ground transmitter means for transmitting first, second and third series of signals from said antennas, respectively; and airborne receiving means on said aircraft for receiving said signals, said airborne receiving means including first means for indicating the lateral position of said aircraft with respect to said vertical plane, and second means for indicating the range of said aircraft with respect to the nearest point on said second antenna.

15. The radio landing system as defined in claim 14, in which said ground transmitter means includes a filter connected to said second antenna, a ground receiver connected to said filter, and a frequency multiplier connected to the output of said ground receiver, the output of said frequency multiplier being connected to said second antenna.

16. The radio landing system as defined in claim 15, which also includes an airborne transmitter, and said ground transmitter means includes phase adjusting means for adjusting the phase of the output signal impressed on said second antenna by said frequency multiplier so as to eliminate the effect of any phase delay at any given point on said second antenna between the signal received by said second antenna from said airborne transmitter and the signal impressed on said second antenna by said frequency multiplier.

17. The radio landing system as defined in claim 14 which also includes an airborne transmitter transmitting a continuous wave having a frequency $f_a$, a ground receiver for receiving said continuous wave $f_a$, a frequency multiplier connected to said airborne transmitter for changing the frequency of said signal from $f_a$ to $f_t$, and a phase meter connected to said airborne receiver and said frequency multiplier for indicating the range of said aircraft with respect to the nearest aircraft or said second antenna, the relationship between $f_a$ and $f_t$ being as follows:

$$f_a = kf_t$$

where $k$ is any whole number or the ratio of any two whole numbers.

18. A radio landing system for aircraft including first and second non-resonant antennas, said first antenna being positioned on ground level along the left side of the runway, and said second antenna being positioned on ground level along the right side of the runway, said antennas being parallel to the longitudinal axis of said runway and extending through the length of said runway, a source of radio frequency connected to said first and second antennas, an electronic keyer connected to said source and to said antennas for alternately energizing said first and second antennas from said radio frequency source, whereby said first and second antennas transmit respectively first and second series of radio frequency pulses, an airborne receiver mounted on said aircraft for receiving said first and second series of pulses, said receiver having a local oscillator coupled to the output of said receiver for receiving said second set of pulses, said second set of pulses controlling the phase of said oscillator, and a phase comparator connected to said oscillator and said receiver for comparing the phase of the wave produced by said oscillator with the phase of said first series of pulses received by said receiver from said first antenna; said comparator indicating the left and right position of said aircraft with respect to said non-resonant antennas.

19. A radio landing system for aircraft, said system indicating the azimuth of said aircraft with respect to the longitudinal axis of the runway used by said aircraft, said system including first and second non-resonant antennas equidistantly spaced from and parallel to said longitudinal axis, both antennas extending through the length of said runway and being positioned at the ground level of said runway, a source of radio frequency, gating and pulse-shaping means for connecting said source first to said first antenna and then to said second antenna for producing respectively first and second series of transmitted radio frequency pulses having the same frequency but different wave forms, an airborne receiver mounted on said aircraft, said receiver including pulse-discriminating means for producing a first series of received pulses on a first conductor and a second series of received pulses on a second conductor, the two series of the received pulses corresponding to the two series of the transmitted pulses, a local oscillator, means for controlling the phase of said oscillator, said last means being connected between said oscillator and said second conductor, whereby said second series of pulses is used for controlling the phase of the oscillator, and a phase comparator connected to the output of said local oscillator and to said first conductor for comparing the phase difference between the continuous sinusoidal wave produced by said oscillator and said first series of the received pulses, and a phase meter connected to the output of said phase comparator for indicating the right and left position, or the azimuth position, of said aircraft with respect to the longitudinal axis of said runway by means of an indication on said meter.

20. The radio landing system, as defined in claim 19, which also includes a third non-resonant antenna extending through the length of said runway and coinciding with the longitudinal axis of said runway, a ground transponder connected to said third antenna, said ground transponder including a ground transmitter and a ground receiver connected to said third antenna, and an airborne transponder on said airplane, including an airborne transmitter and an airborne receiver, said airborne transmitter transmitting a continuous signal of frequency $f_a$ to said ground receiver and said ground transmitter transmitting a signal having frequency $f_t$ to said airborne receiver, a frequency multiplier connected to said airborne transmitter for multiplying said frequency $f_a$ to frequency $f_t$, and a phase meter connected to said frequency multiplier and said airborne receiver for indicating the range of said aircraft with respect to said third antenna.

21. A radio landing system for aircraft, said radio landing system indicating the azimuth and the range of said aircraft with respect to a runway used by said aircraft for a landing at an airport, said radio landing system including first, second and third non-resonant antennas equally spaced from each other and being parallel to each other, said second antenna being the central antenna coinciding with the longitudinal axis of said runway and said first and second antennas being the left and right antennas respectively, all of the antennas extending through the length of said runway, a common source of radio frequency connected to said first, second, and third antennas, gating means connected between said source and said antennas for gating the radio frequency impressed through said gating means on said antennas so as to transmit first, second and third series of sequentially timed radio pulses, and an airborne receiver carried by said aircraft, said airborne receiver including first, second and third gate circuits connected to said receiver, an electronic gating pulse generating means connected to said receiver on the input side and to said first, second and third gating circuits, respectively, for sequentially gating said first, second and third gating means, so as to produce first, second and third series of sequentially timed received pulses in the outputs of said gating circuits, said first, second and third series of the received pulses corresponding to the first, second and third series of the transmitted radio pulses, a local oscillator, first controlling circuit connected on one side to said oscillator and on the other side to the output of said third gating circuit, whereby the third series of the received pulses is used for synchronizing, or cophasing, the sinusoidal wave output of said oscillator with the phase of said third series of received pulses, a first phase comparator connected to the output of said oscillator and to the output of said second gating circuit for comparing the phase of said sinusoidal wave with the phase of the second series of the received pulses, a second phase comparator connected to said oscillator and to the output of the first gating circuit for comparing the phase of said sinusoidal wave with the phase of the first series of the received pulses, an analog computer connected to the outputs of said first and second phase comparators, and the first and second indicating means connected to the output of said analog computer for indicating, respectively, the range and the azimuth of said aircraft with respect to said second antenna.

References Cited in the file of this patent

UNITED STATES PATENTS

| | | |
|---|---|---|
| 1,787,992 | McIlvaine | Jan. 6, 1931 |
| 2,748,385 | Rust | May 29, 1956 |

FOREIGN PATENTS

| | | |
|---|---|---|
| 63,410 | Denmark | Apr. 9, 1945 |